Feb. 4, 1930. L. P. THOMPSON 1,746,093
DETACHABLE HANDLE FOR PIE TINS
Filed March 18, 1929
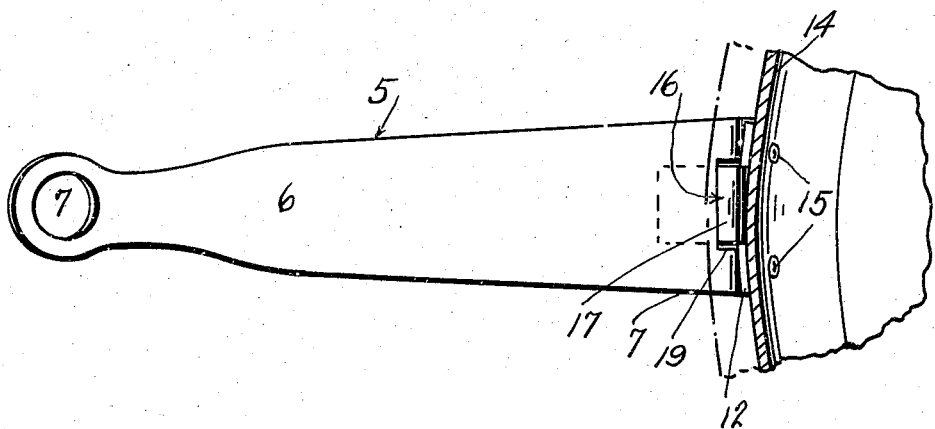
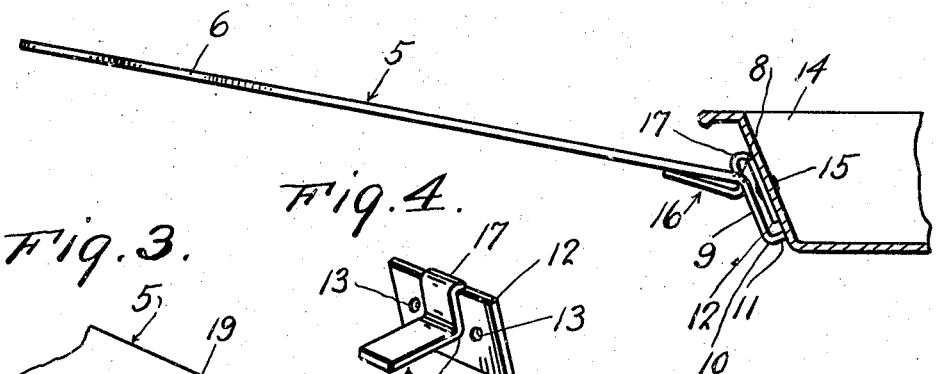
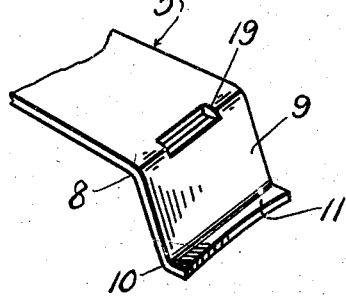
Inventor
L. P. Thompson
By Clarence A. O'Brien
Attorney Patented Feb. 4, 1930

1,746,093

UNITED STATES PATENT OFFICE

LESLIE P. THOMPSON, OF ASTORIA, OREGON

DETACHABLE HANDLE FOR PIE TINS

Application filed March 18, 1929. Serial No. 348,043.

This invention relates to an improvement in handles, and more especially to a detachable handle especially applicable for use on pie tins.

The primary object of this invention is to provide a handle of the type above set forth, which may be quickly and easily attached or detached from a pie tin whereby the tin may be conveniently handled for placing the same within, or removing the same from a heated oven.

Another very important object of this invention is to provide a detachable handle, especially applicable for use on pie tins, whereby the danger of burning one's hands is practically eliminated, since the handle may be removed during the cooking of the contents of the tin, and quickly and easily applied to the tin, when it is desired to remove the tin, together with its contents, from the heated oven.

Another very important object of this invention is to provide a handle which will be inexpensive to manufacture, may be retailed at a reasonable cost, handy, simple in construction, and which may be used with a cooking receptacle of any character, but which is especially applicable to a pie tin, and can be used therewith without in any way materially differing the construction of the tin.

The above and numerous other objects of the invention will become readily apparent during a study of the following description taken in connection with the accompanying drawings, wherein:

Figure 1 is a top plan view with parts broken away, showing my improved handle attached to a pie tin.

Figure 2 is a side elevation of the same.

Figure 3 is a detail sectional view of one end of the handle, and

Figure 4 is a detail perspective view of a plate forming part of my invention.

With reference more in detail to the drawings, it will be seen that my improved handle, designated generally by the reference character 5 comprises a substantially elongated strip of metal or other suitable material, which may be of any conventional width, and is preferably formed so as to taper at one end as at 6, and having an opening 7 formed at said one end of the handle whereby the handle may be suitably hung upon a hook on the wall or in any convenient place. The opposite end of the handle 5 is relatively wider as at 7, and constitutes the widest portion of the handle. This end of the handle is preferably offset as at 8 to provide a downwardly and forwardly extending projection 9 which projection 9 is flanged as at 10 to provide a forwardly extending portion 11 for a purpose to be hereinafter more fully set forth.

My invention further contemplates the use of a substantially rectangular plate 12 provided with openings 13—13, and the plate 12 being attached to the pie tin 14 by means of bolts 15, in a manner clearly shown to advantage in Figure 2 of the drawings.

Formed on the upper edge of the plate 12 is a finger 16 which is bent as at 17 to extend downwardly for substantially half the width of the plate 12, and is then again bent as at 18 to extend forwardly and slightly upwardly from the said plate 12.

It is yet to be mentioned that the handle 5 is provided with a slot 19 which extends transversely of the handle, and is formed at the junction of the offset portion of the handle as shown to advantage in Figure 3 of the drawings.

In operation the plate 12 is fixed to the pie tin 14 as illustrated and before described. The notch 19 in the handle 5 is then slipped over the projection or fingers 16 so that the upper end of the fingers 16 rest against the under surface of the handle 5 as shown in Figure 2, and the offset portion 9 of the handle extends downwardly so as to permit the projection 11 which is so formed as to correspond to the rounded wall of the pie tin 14, to rest against the wall of the pie tin, beneath the bottom edge of the plate 12 as shown to advantage in Figure 2.

From the foregoing description it will be seen that I have provided an improved handle, which may be quickly and easily detached or attached to a pie tin, and which will be found especially useful for removing the hot tin from a heated oven.

Even though I have herein shown and described the preferred embodiment of my invention, it is to be understood however, that minor changes, in shape, size, and proportion, coming within the field of invention claimed may be resorted to if desired.

Having thus described the invention, what I claim as new and desire to secure by Letters Patent is:—

1. In a device of the character described, a handle formed at one end in a downwardly and forwardly extending offset portion, a transverse slot formed in the handle at the juncture of the offset portion, a plate adapted to be fixed to a pie tin, a forwardly extending projection on the upper edge of the plate, and adapted to enter the notch in said handle, and a forwardly extending projection formed on the extreme end of said offset portion for rest against the tin adjacent the bottom edge of said plate.

2. In a device of the character described, a plate adapted to be fixed to a pie tin, said plate being provided with a finger member extending downwardly from the upper edge of the plate in spaced relation to the plate, said finger member being bent intermediate its ends to provide an upwardly extending forwardly projecting portion extending outwardly from said plate, and a handle member formed at one end in a downwardly and forwardly extending offset portion, said handle member being provided with a transverse slot formed therein at the juncture of the offset portion, through which the forwardly extending portion of the finger is adapted to extend whereby said slot may receive the downwardly disposed portion of the finger and the upper edge of the first mentioned portion of the finger adapted to engage the handle member at the upper edge of the handle member for supporting the same in applied position and the said offset portion of the handle member terminating in a forwardly extending projection adapted to engage with the tin in spaced relation with the lower edge of the said plate.

In testimony whereof I affix my signature.

LESLIE P. THOMPSON.